No. 851,452. PATENTED APR. 23, 1907.
A. G. STIMPKE.
GRASS BEATER.
APPLICATION FILED DEC. 4, 1905.

2 SHEETS—SHEET 1.

Fig. I.

Witnesses
Inventor
A. G. Stimpke
By
Attorneys

No. 851,452. PATENTED APR. 23, 1907.
A. G. STIMPKE.
GRASS BEATER.
APPLICATION FILED DEC. 4, 1905.

3 SHEETS—SHEET 2.

Witnesses
O. K. Reichenbach
J. C. Jones

Inventor
A. G. Stimpke
By
Attorneys

UNITED STATES PATENT OFFICE.

ARTHUR G. STIMPKE, OF GENESEO TOWNSHIP, ROBERTS COUNTY, SOUTH DAKOTA.

GRASS-BEATER.

No. 851,452.      Specification of Letters Patent.      Patented April 23, 1907.

Application filed December 4, 1905. Serial No. 290,220.

*To all whom it may concern:*

Be it known that I, ARTHUR G. STIMPKE, a citizen of the United States, residing at Geneseo township, in the county of Roberts, State of South Dakota, have invented certain new and useful Improvements in Grass-Beaters; and I do hereby declare the following to be a full, clear, and exact description of the invention, such as will enable others skilled in the art to which it appertains to make and use the same.

This invention relates to grass beaters.

One object is to provide an exceedingly simple, inexpensive, durable and efficient machine of that class adapted particularly for destroying certain characters of grass or weeds growing up in a field of grass, wheat or the like.

In certain fields it has been discovered that there is a grass bearing a sharp seed called "the prairie needle" and as long as the same remains in the head of the grass, they are apt to be eaten by animals feeding upon the grass of the field. Therefore, since these seeds are sharp and are liable to be eaten by the animals pasturing in the field and especially since they are of such nature as to kill off the animals partaking thereof, I have designed the present invention for the purpose of contacting with the heads of the seed and causing the latter to be removed from the heads and dropped to the ground.

With these and other objects in view, the present invention consists in the combination and arrangement of parts as will be hereinafter more fully described, shown in the accompanying drawings and particularly pointed out in the appended claims, it being understood that changes in the form, proportion, size and minor details may be made, within the scope of the claims, without departing from the spirit or sacrificing any of the advantages of the invention.

Figure 4:
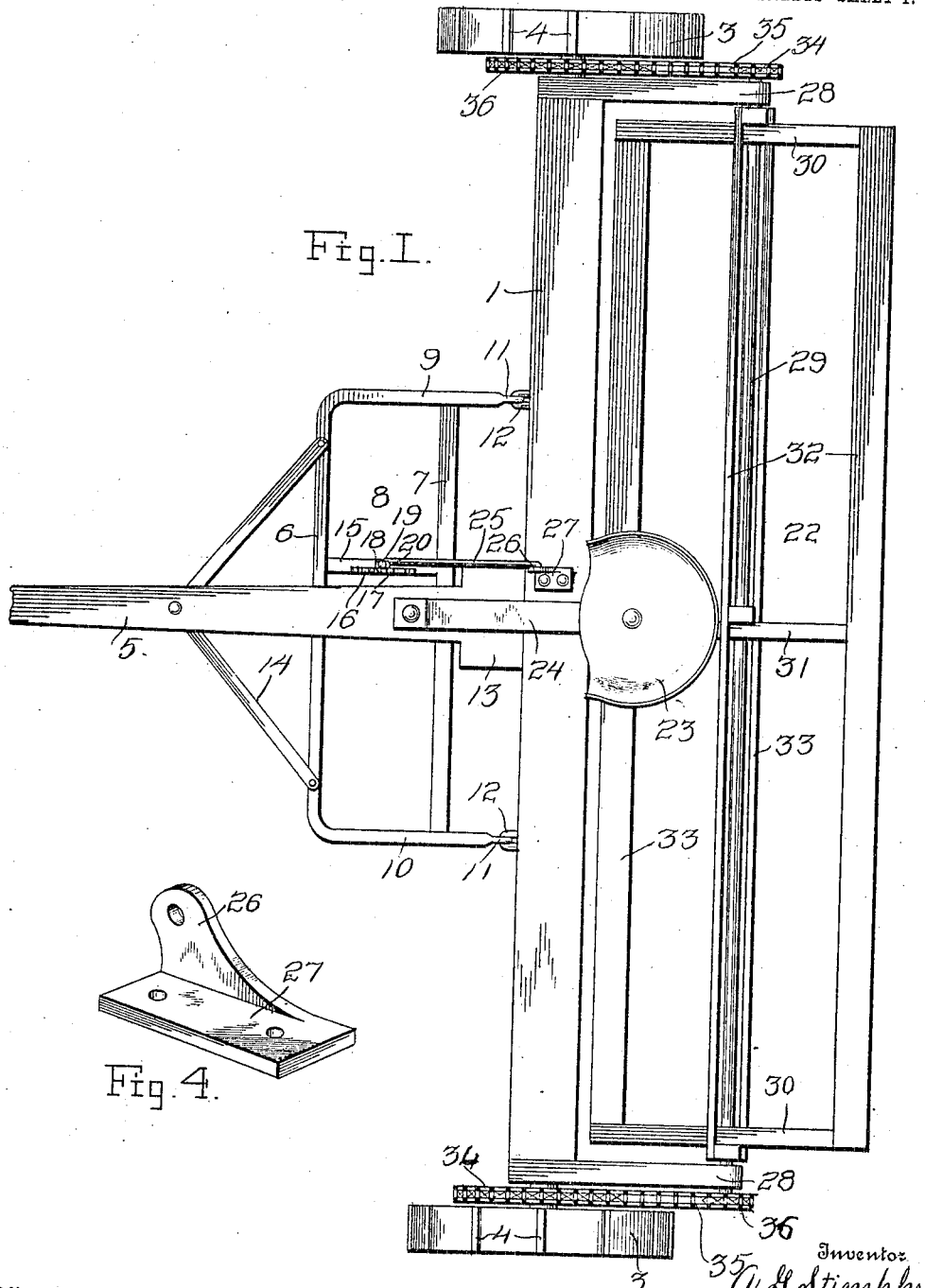
Figure 2:
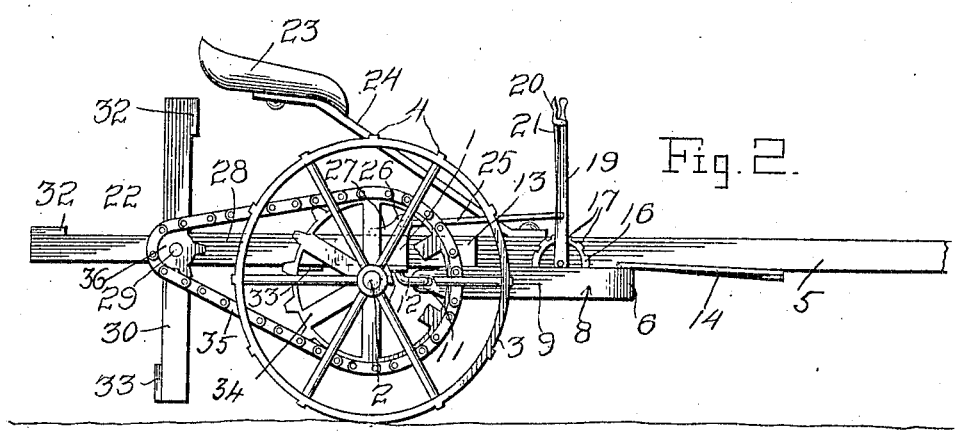
Figure 3:
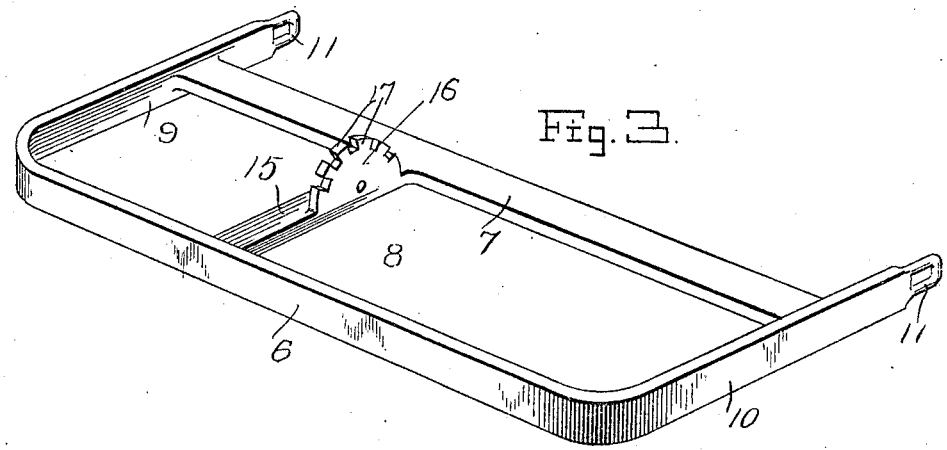

In the drawings: Figure 1 is a top plan view of my invention. Fig. 2 is a side elevation, a portion of the corresponding ground wheel being broken away. Fig. 3 is an enlarged detail view of the yoke. Fig. 4 is a detail view of the plate secured to the beam by which connection is made with the operating-lever.

Referring now more particularly to the accompanying drawings, the reference character 1 indicates a beam or bolster to which is secured an axle 2 at the ends of which latter are disposed the ground or traction wheels 3 provided with projections 4 upon their peripheries to prevent slipping thereof.

A draft tongue 5 is provided for the present machine and is disposed at its rear end upon the bight portion 6 and the cross piece 7 of the yoke frame 8, whose legs 9 and 10 are provided with eyes 11 for engagement with the eyes 12 secured to the under face of the beam or bolster 1. It will thus be seen that the yoke 8 is pivotally connected to the beam or bolster 1 and it is to be understood that the inner headed end 13 of the draft tongue is not fixedly connected to the beam or bolster 1 but loosely engages the forward edge thereof. The draft tongue 5 is secured to the bight portion 6 of the yoke frame 8 by means of the oblique braces 14 and between the bight portion 6 and the cross piece 7 which connects the legs 9 and 10 of the yoke frame, I arrange a beam 15 upon which is secured a segment 16 provided with teeth 17 which latter are designed to co-operate with a pawl 18 arranged upon the lower end of a lever 19 pivoted upon the said beam 15. This pawl 18 has connection with the hand piece 20 of the lever 19 through the instrumentality of a link connection 21, as shown. This lever 19 in its co-operation with the segment 16 is designed to throw the beam 1 and the axle 2 to different positions according to the height of the grass or the height of the injurious seeds of the grass hereinbefore referred to so as to dispose the reel 22 accordingly. It will thus be seen that the reel 22 may be raised or lowered and in order that this movement of the reel may be accomplished without the operator leaving his seat 23, which is disposed upon the seat post 24 secured at its lower end to the inner end of the beam 5, I arrange the seat in close proximity to the operating-lever 19, and connect the operating lever 19 by a link 25 with the upwardly turned end 26 of a plate 27 secured to the upper face of the beam or bolster 1.

Secured at each end of the beam or axle 1 is a rearwardly directed arm 28, in the outer end of each of which is journaled a shaft 29 arranged parallel with the beam 1 and axle 2. At the end of this shaft 29 there are fixedly disposed the cross heads 30, while the intermediate cross head 31 is fixedly secured to the shaft intermediate the ends of the latter. Connecting one end of the corresponding edges of the corresponding members of the end and intermediate cross heads are blades 32 while connecting the opposite ends of the same members of the said cross heads and upon the opposite sides of the members is a blade 33. These blades are designed to contact with the foreign grass and remove the seeds thereof from their shells. In order that the reel may be revolved, it is necessary that the arms 28 extend rearwardly of the beam 1 and axle 2 to permit of rotation of the cross heads and blade connections therebetween and in order to rotate the reel, I provide sprocket wheels 34 upon the opposite ends of the axle between the ground wheels and corresponding ends of the beam 1 and to these sprocket wheels, I connect a chain 35 leading to sprocket wheels 36 carried at the corresponding ends of the aforesaid shaft 29. Obviously, therefore, upon forward or backward movement of the machine, the reel proper is caused to revolve through the instrumentality of the said sprocket wheels and chain connections referred to.

From the foregoing, it will be readily appreciated that the foreign grass mentioned may be of different heights at the time it is desired to remove the seed therefrom and that consequently, the reel proper must be adjusted vertically according to the height of the seeds of the grass. The manner in which this adjustment of the reel is accomplished should be readily understood from the foregoing description.

What is claimed is:

A device of the class described comprising in combination a frame including a main beam having a pair of eyes secured to its front face; a rearwardly extending arm secured to each end of said main beam; an axle carried by said main beam and provided with traction wheels; a shaft journaled in the outer end of said arms; a reel mounted upon said shaft between said arms and provided with transversely disposed blades; a driving connection between said axle and shaft to rotate the latter and the reel carried thereby; a forwardly-projecting yoke pivoted at its free ends directly to the eyes on said main beam; a cross-piece connecting the arms of said yoke; a draft tongue rigidly secured to the bight portion and cross-piece of said yoke; a supplemental beam connecting the bight portion and cross piece of said yoke; a segmental rack mounted upon said supplemental beam; a lever pivoted to said supplemental beam and provided with a spring actuated pawl for engagement with said rack; and a link connection between said lever and main beam, to adjust the frame and the reel carried thereby to different heights upon movement of the lever.

In testimony whereof, I affix my signature, in presence of two witnesses.

ARTHUR G. STIMPKE.

Witnesses:
J. E. LAMMEL,
H. A. KROGUES.